Aug. 18, 1970 L. O. STEGER, JR 3,524,477
PLASTIC PNEUMATIC TRANSMISSION DUCT INSTALLATION
Filed Nov. 20, 1968 3 Sheets-Sheet 2
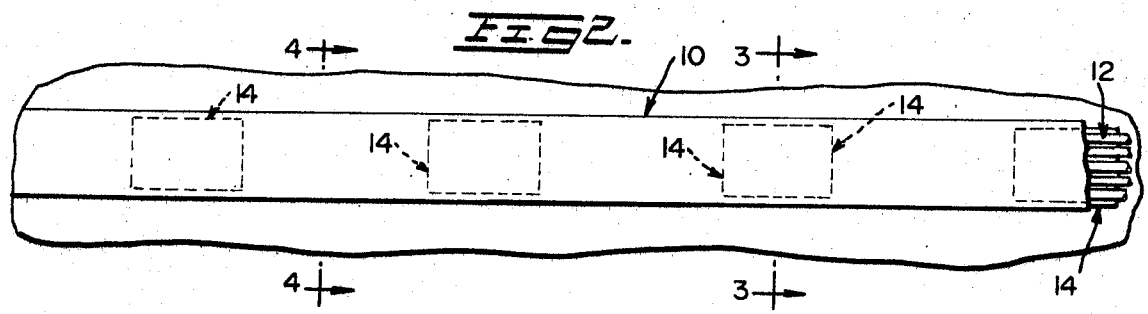
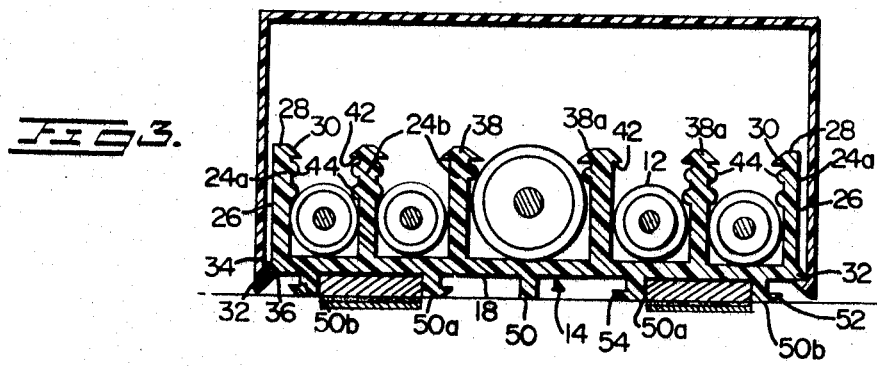
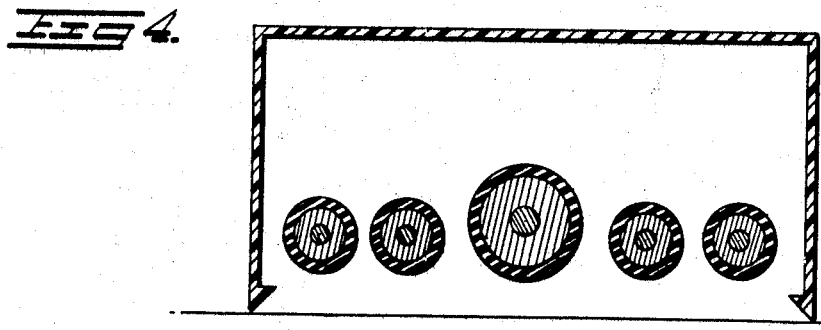
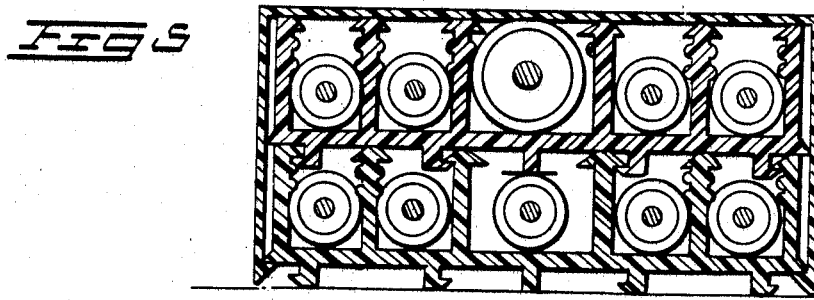
INVENTOR
LYALL O. STEGER
Christen, Sabol & O'Brien
ATTORNEYS

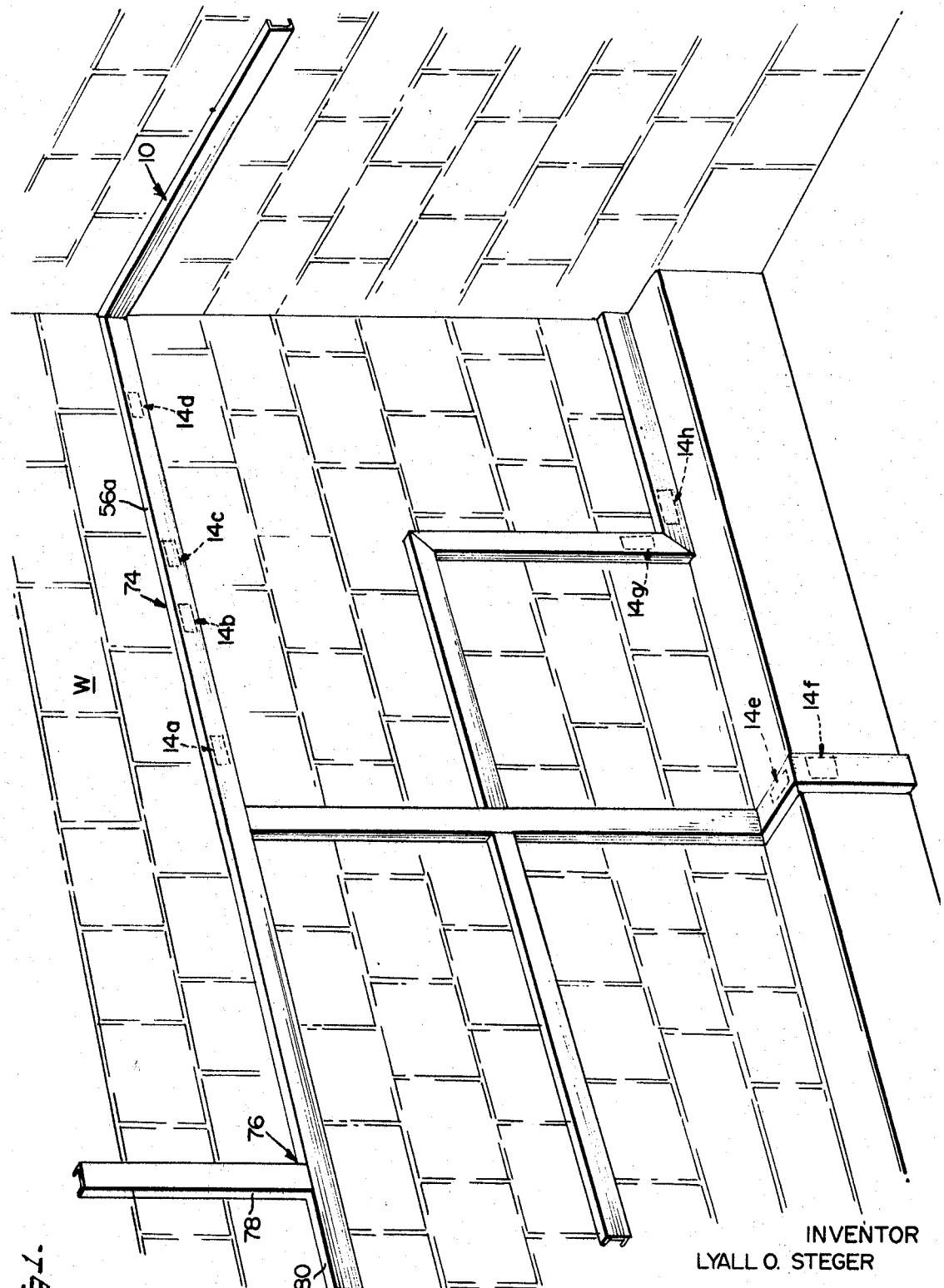

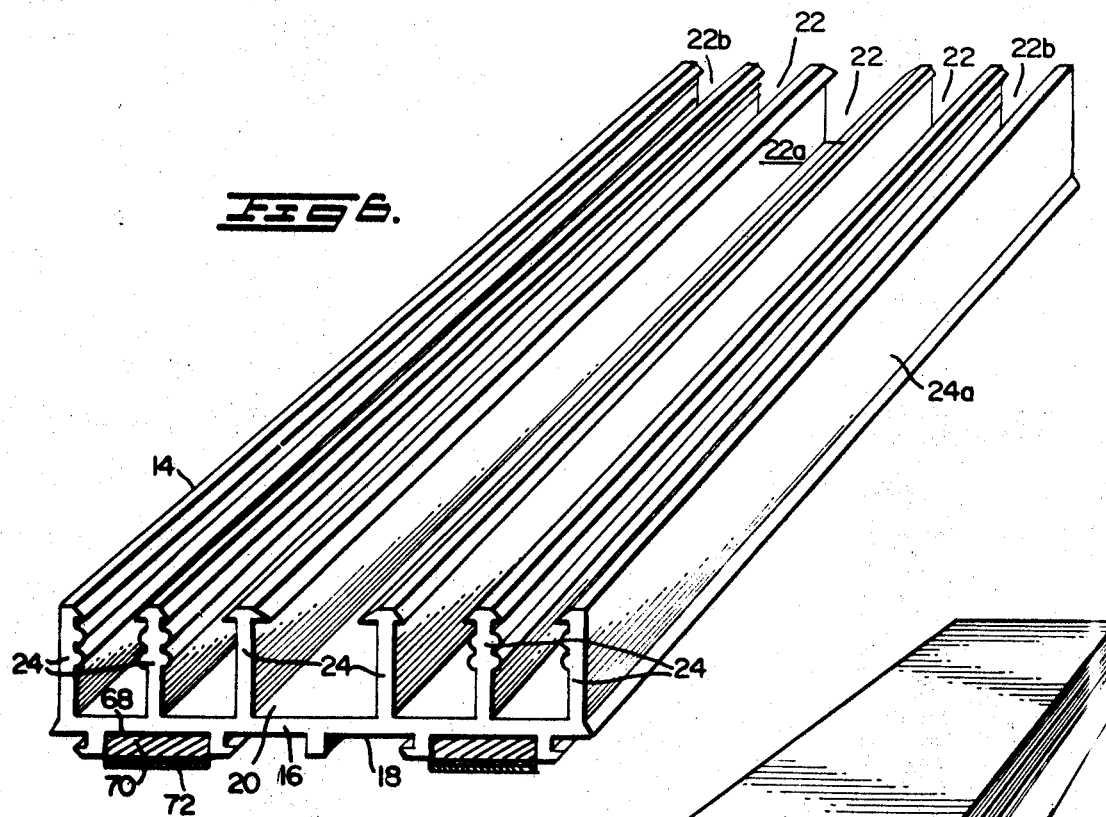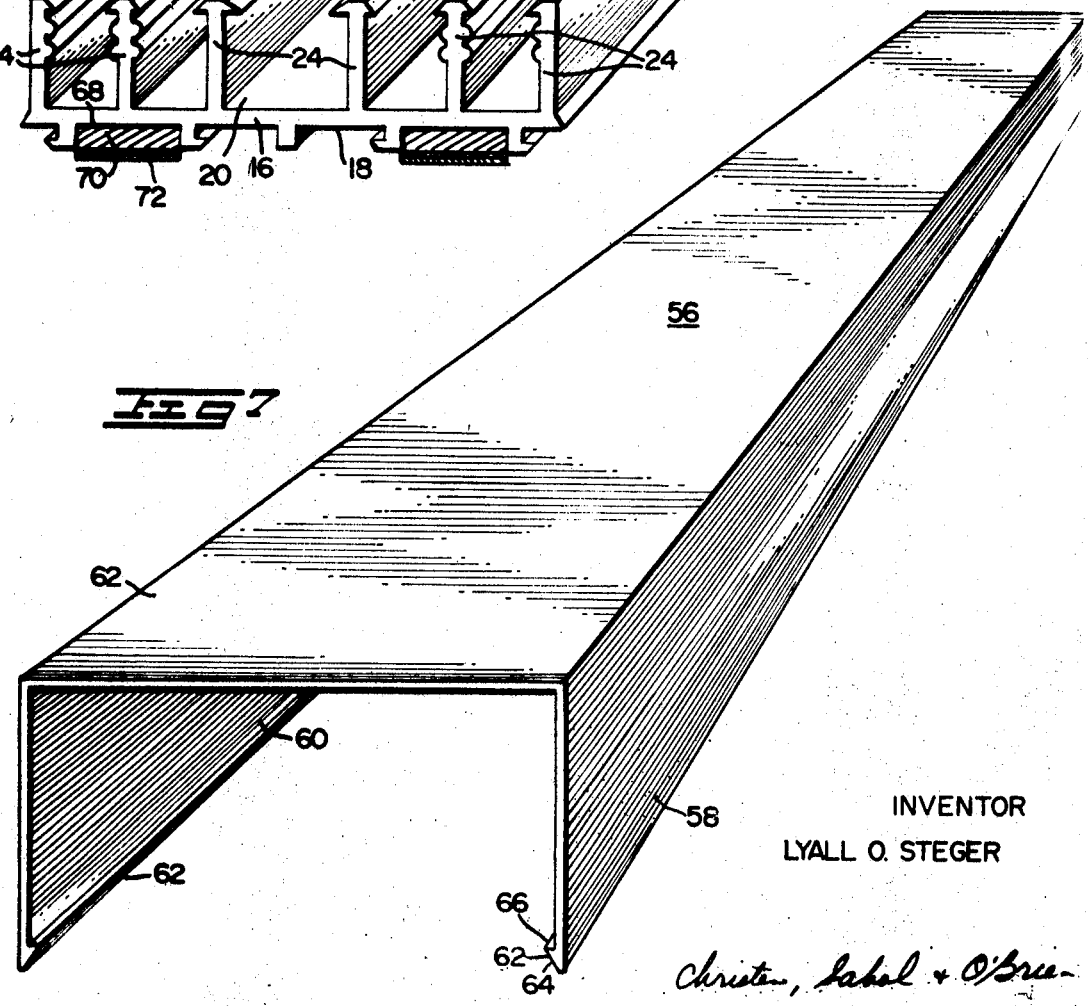

United States Patent Office 3,524,477
Patented Aug. 18, 1970

3,524,477
PLASTIC PNEUMATIC TRANSMISSION DUCT INSTALLATION
Lyall O. Steger, Jr., Richmond, Va., assignor to Robertshaw Controls Company, Richmond, Va., a corporation of Delaware
Filed Nov. 20, 1968, Ser. No. 777,355
Int. Cl. F16l 3/00
U.S. Cl. 138—106                            14 Claims

ABSTRACT OF THE DISCLOSURE

A plastic duct installation for pneumatic control systems involving polyethylene tubing in lengthy lines supportingly attached at spaced points in varying geometrical layouts on a supporting surface by relatively short plastic brackets, each having lengthwise separate channels in which the lines of tubing are laterally snap-fitted and restrained from accidental lateral dislodgement by beadings on the confronting faces of the channel walls while, during placement, being longitudinally slidable therein, and relatively long sections of U-shaped plastic covers encasingly overlying the entire extent of the tubing and spaced brackets and interlockingly snap anchored onto the brackets which have longitudinally ribbed base faces fixedly superimposed by adhesive or penetrating fasteners onto the supporting surface.

BACKGROUND OF THE INVENTION

Field of the invention

The present invention generally appertains to improvements in conduit systems for wires, cables, tubing and the like carriers for flow type energy and, more particularly, relates to new and novel improvements in the installation of polyethylene pneumatic transmission tubing for carrying air pressure signals in automatic temperature control systems for buildings.

Description of the prior art

Little progress, in the commercial and patent fields, has been made over the years in the improvement of materials and systems or installations for installing pneumatic transmission tubing used for carrying air pressure signals in automatic temperature controls systems for buildings.

Conventional copper tubing, involving high material expense and labor costs and presenting leakage problems, due to the need for fittings, and having other drawbacks from the important present day considerations of operational efficiency and economic installation and operation, is still being used as the pneumatic tubing. Because of the cost factors, from the standpoints of installation and operation, the industry is gradually moving away from copper tubing and is leaning toward the utilization of polyethylene and similar plastic tubing. Such non-metallic tubing has performed well and is receiving a marked measure of increased acceptance in the construction industry. With an automatic temperature control system, such polyethylene tubing has many advantages. It is easier to install, lower in costs, lighter in weight, cleaner and less likely to contain dirt that clogs the instruments. Further, long runs can be made without fittings and this is very important for every fitting is a potential source of leakage on systems of this type will show up as an error regardless of instruments used.

However, the chief obstacle to the wholesale acceptance of polyethylene tubing has been the lack of satisfactory means for installing it in exposed spaces, such as equipment rooms. Most installations of polyethylene tubing are rather sloppy and unprofessional, giving a bad appearance to the room and resulting in breakdowns during performance. Furthermore, such unattractive and malfunctioning installations have required the installing services of at least two workmen.

As presently installed, the plastic tubing is laid out in long strips of the appropriate lengths on the floor and then at least two workmen are required to tape the tubing into bundles which are fed into conduits. The conduits are anchored in place on the walls and are necessary to prevent the tubing from sagging, to protect it from attacks by rodents, and to ensure against other damage or deterioration from outside sources. Further, such conduit or a similar enclosure is necessary from an aesthetic standpoint. For example, if the tubing were merely clamped to the surface of a supporting wall or ceiling, it would sag in such a manner that it might breakdown in function and its appearance would also be completely unacceptable.

Therefore, while the merits of polyethylene tubing and the advantages thereof over the long-used, conventional copper tubing are well-recognized in the industry, the acceptance and commonplace use of the polyethylene pneumatic tubing has been thwarted because of the absence of a way to mount the tubing faster and less expensively and yet in a manner which would result in a professional looking installation that would stand the test of performance and time.

SUMMARY

The present invention relates to a plastic tubing system which is intended to replace the copper tubing, heretofore used, and which is primarily designed for carrying air pressure signals in a pneumatic control system for a building. Such tubing system involves a plastic duct installation wherein the lengthy side by side individual polyethylene tubing lines are supportingly attached at selected spaced points on a wall or similar fixed supporting surface by relatively short plastic brackets having parallel, separate and integrally related longitudinal channels in which the lengths of tubing are laterally snap-fitted and held from accidental lateral dislodgement while being longitudinally slideable therein so as to be pulled taut in the final installation process. The plastic brackets are cut from a long length of polyvinyl extrusion. Most usually, the brackets are cut from the long supply length in approximately six inch sizes and are attached to the wall or ceiling supporting surface at spaced apart intervals. The brackets may be fastened to any wall or ceiling supporting surface by means of a commercially available pressure adhesive provided on the base surfaces thereof. The adhesive is protected by a peel-off strip of paper or flexible plastic with the strip being peeled from the base surface thereby exposing the film of pressure sensitive adhesive so that the brackets may be imply stuck onto the supporting surface and will remain in place. Instead of adhesively bonding the brackets onto the supporting surface, a pin or other appropriate penetrating fastener can be used to fixedly superimpose the base of the brackets on the appropriate supporting surface.

The relatively short lengths of the multiple-channel or track brackets are secured in a relatively spaced apart relationship to the supporting surface and are disposed thereon in any geometrical arrangement or layout depending upon the linear pattern which the tubing is to follow on the supporting surface. The channels in the brackets are of a width to hold the plastic tubing of varying outer diameters firmly in place once the plastic tubing lines are gently laterally pressed into the channels which have confronting side walls having a certain resiliency to give upon the lateral entrance of the tubing. The confronting faces of the channel walls have longitudinal beading which frictionally grip and hold the tubing so as to prevent accidental withdrawal or dislodgement thereof while, at the same time, permitting the tubing lines to be slid axially in the channels. The exact spacing between the brackets can vary, for example from one to seven feet, and may be in close proximity at turns and junctions. The lengths of tubing are inserted in the channels and are frictionally held therein with the tubing being tightened very readily and any sag removed by tugging on the ends of the tubing lines so as to cause the tubing lines to slide axially in the channels.

The brackets are provided with base surfaces having longitudinal, laterally spaced ribs, provided with lips that interlock with lips on the outer longitudinal edges of the channel walls so that the brackets can be snappingly interlocked in piggyback relation to increase the carrying capacity thereof. Thus, there are interlocking means on both the top and bottom of the brackets which will allow the workman to snap the base of one bracket onto the top of another and the interlocking means will hold the base of the outer bracket onto the bottom or inner bracket so that the brackets can be disposed in overlying, self-interlocking piggyback relation. Further, such interlocking will permit the brackets to be disposed in piggyback spread and longitudinally offset interlocked relations rather than completely overlying relation and will also enable the brackets to be disposed in a side by side relationship so that various interlocked arrangements are feasible which will permit the carrying capacity of the brackets to be increased.

Once the lines of tubing are installed in the channels of the mounted brackets, plastic covers are snapped in place to overlie and conceal the brackets and tubing. The covers are of U-shaped cross-sectional form and the outer longitudinal edges of the legs of the covers have inwardly directed integral lips which are adapted to cam over and lockingly engage under complemental interlocking projections of the side edges of the bases of the brackets so that the plastic covers are snapped onto the brackets and locked thereto with the covers completely encasing the total extent of the tubing and the brackets. The covers are commonly of a size to be snapped in place on singly mounted brackets or on and over the piggyback double layered brackets.

The covers are designed so that they can be formed at the installation site with engaging and mating ends whereby various geometrical layouts or arrangements can be realized with the covers being cut and installed so that the ends mate. For example, a straight, flat long run can be provided or a single run can be taken around inside or outside corners or angular branches can be led off from a long run.

The brackets with the separate channels receive and contain the individual lines of plastic tubing and the side walls of the channels are provided with longitudinal hemispherical beading that grip the tubing and place the necessary but limited amount of tension thereon so as to hold the tubing free from stress cracking by distributing the stress over a larger surface area of the tubing. The tubing is prevented from accidental lateral dislodgement but is free to be pulled in sliding longitudinal movement in the channels so that the single workman can remove the slack between the running span of the tubing intermediate the spaced apart brackets attached to the supporting surface.

The base ribs on the brackets slightly space the bases of the brackets from the supporting surface besides functioning in the interlocking of the brackets in piggyback relationships. Because of the spacing function of the ribs, the brackets can be mounted in spaced apart relationship on an uneven supporting surface and the spacement of the brackets will compensate for all sorts of surface irregularities with the ribs also spacing the bases slightly away from the wall surface so as to enable the inturned locking lips on the free edges of the side walls of the covers to interlock with laterally projecting lips on the side edges of the bracket bases. The pressure adhesive is disposed within the longitudinal grooves defined on the underside or bottoms of the brackets by the longitudinally extending and laterally spaced apart ribs.

It can be appreciated that one workman can install the plastic tubing duct since all that is necessary is for the workman to arrive at a reference line and proceed to attach the brackets to the supporting surface with the brackets being installed in spaced apart relation by use of the pressure sensitive adhesive on the brackets or by driving surface penetrating fasteners through the bases of the brackets into the supporting surface. After all of the brackets are installed in the desired geometrical pattern, the individual tubing lines are snapped into place and pulled tight and then the covers are snapped over the total extent of the tubing and the brackets and become interlocked with the brackets.

Accordingly, an important object of the present invention is to provide a plastic duct arrangement for installing pneumatic tubing or the like in a faster, less expensive manner, requiring the services of only a single, unskilled workman, and yet in a manner that results in a professional looking installation that will withstand the test of performance and time.

A further important object of the present invention is to provide a plastic pneumatic transmission tubing installation for automatic temperature control systems and the like whereby any number of plastic tubes can be securely and positively affixed to a wall or ceiling surface in any geometrical pattern and whereby the lines will be completely encased and protectively covered by a snap-on cover, the installation enabling the tubing to extend in any geometrical arrangement, whether straight line, angular, around corners, curves, or the like, with the cover being easily formed at the site so as to have the ends in mating engaging relation and the cover completely enclosing and protecting the entire extent of the tubing.

Another important object of the present invention is to provide a plastic duct arrangement wherein the various components snap and interlock together so that one workman can rapidly install a complete installation without utilizing any interconnecting fasteners and required tools and with the tubing lines being so separately retained that the installation permits ready line tracing visually rather than having to resort to other cumbersome techniques.

BRIEF DESCRIPTION OF THE DRAWINGS

FIG. 1 is a perspective exemplary showing of a completed installation on a wall surface, with the tubing lines partially shown in phantom lines and the brackets for the tubing lines being shown partially in dotted lines, so as to present an overall picture and impart a clear understanding of the present invention involving the mounting and installing of plastic tubing on a supporting surface, such as the illustrated wall.

FIG. 2 is a fragmentary elevational view of one section of the installed duct.

FIG. 3 is a transverse cross-sectional view, taken substantially on line 3—3 of FIG. 2, and showing the interlocking engagement between the cover and the brackets and the placement of the tubing lines in the channels of the bracket.

FIG. 4 is a cross-sectional view, taken substantially on line 4—4 of FIG. 2, through a portion of the installation intermediate adjoining brackets to show how the cover encases the unsupported tubing in its span between the mounting brackets.

FIG. 5 is a cross-sectional view similar to FIG. 4 but showing a piggyback arrangement wherein two of the brackets are disposed in an interlocked, overlying or layer relation with the cover encasing the piggyback brackets and locked to the innermost wall mounted bracket.

FIG. 6 is a perspective view of one of the brackets, showing the pressure adhesive arrangement for adhesively fastening the base of the bracket on a supporting wall surface instead of utilizing a wall penetrating fastener.

FIG. 7 is a perspective view of the cover.

DESCRIPTION OF THE PREFERRED EMBODIMENT

Referring now more particularly to the accompanying drawings, reference numeral 10 generally designates the plastic duct installation of the present invention which is composed of a plurality of lines of polyethylene or similar plastic tubing 12 which are utilized in an automatic temperature control system for pneumatic transmission in lieu of more expensive and less dependable conventional copper tubing. The existence and use of such non-metallic plastic tubing is known in the industry but the difficulty, as discussed in the foreign, has resided in the lack of a proper, convenient, inexpensive and dependable installation means.

In line with the latter, the present invention includes a plurality of mounting brackets 14 shown more particularly in FIG. 6. The brackets are in the form of relatively short sections cut from extruded lengths of polyvinyl. Each bracket, as shown in FIG. 6, comprises a base 16 having an undersurface or bottom 18 and an upper side or outer surface 20 on which a plurality of channels 22 are provided. The channels 22 include upstanding, laterally spaced, longitudinally extending walls 24 which cooperate with the face 20 of the base to provide the spaced apart channels of varying desired widths. As illustrated, there is a realtively wide large center channel 22a which is provided to accommodate and firmly grip a ⅜" O.D. plastic tubing or two pieces of ¼" O.D. plastic tubing; while on either side of the center channel there are two side channels 22b, which are of a width to hold ¼" O.D. plastic tubing firmly in place.

The outer walls 24a have flat and planar outer faces or surfaces 26 and have outer free longitudinal squared off edges 28 provided with inwardly directed triangular locking shoulders 30. Locking lips 32 of generally triangular cross-sectional configuration protrude laterally outwardly from the base edges of the walls 24a and define locking projections on the longitudinal side edges of the base 16 of each bracket 14. The locking lips or projections 32 have inwardly and downwardly slanting camming edges 34 and inside locking edges 36 normal to the channels. The inside walls 24b, which lie in laterally spaced realtion within the outermost walls 24a, have longitudinally extending free edges 38 that are substantially T-shaped and are substantially coplanar with each other and with the outer edges 28 of the outer side walls. The T-shaped outer edges 38 have inwardly and downwardly slanting outer cam edges 38a and right angular inner locking shoulders or edges 42 with such edge formation enabling the tubing to be easily pressed laterally into the channels. The walls of the channels firmly grip the tubing once the tubing is in place.

The confronting surfaces of the channel walls are formed with lengthwise extending hemispherical beadings 44 that cooperate to grip the plastic tubing. In this regard, the amount of tension to be placed on the polyethylene tubing is critical because it will stress crack in response to extensive stress and the hemispherical beading 44 being extending the length of the walls distributes the stress over a large surface area of the polyethylene tubing. The thusly rippled or currugated walls of the channels grip the tubing evenly and gently and prevent accidental lateral dislodgement or withdrawal thereof while allowing the tubing to be slid longitudinally within the channels.

Each bracket is provided on the underface 18 of its base with longitudinally extending laterally spaced ribs which include a longitudinal center rib 50 and laterally spaced side by side outer ribs 50b and inner ribs 50a. The outermost ribs 50b have out-turned lips 52, while the innermost ribs 50a have inturned lips 54 that define an interlocking arrangement with the outer free longitudinal edges 28 and 38 on the channel walls of an underlying bracket, as can be appreciated from a consideration of FIG. 5.

An elongated U-shaped plastic cover 56, formed in long sections from polyvinyl extrusion, is provided to overlie and encase the tubing in its attached association with the spaced apart mounting brackets 14 and in its span between the brackets. The cover 56 has opposing, substantially parallel leg portions 58 and 60 connected by a bight portion 62. The longitudinal free edges of the leg portions 58 and 60 are formed with inturned triangular locking lips 62 that have outer wedge surfaces 64 and inner locking shoulders 66 arranged normal to the leg portions.

The cover 56 is fitted over the extent of the tubing to encase the tubing and the locking lips 62 interlockingly engage in a snap-fit assembly with the locking lips or projections 32 on the bases of the brackets 14.

The cover is of a depth so as to encase the piggyback arranged brackets of FIG. 5 while interlockingly engaging the innermost bracket and also can just as reliably snap-fit over and onto the single bracket, as shown in FIG. 3.

As shown in FIG. 6, the ribs 50a and 50b on the base of each of the brackets 14 define therebetween longitudinally extending shallow grooves 68 in which a film or tape 70 of commercially available pressure adhesive is positioned and which is covered by a peel-off strip 72 of plastic or paper.

Just prior to installation the protective strip 72 will be removed and the brackets will be pressed against the supporting or mounting surface W with reference to FIGS. 1 to 3.

If the ambient temperature is above 50° F. at the time of installation, the tape will firmly bond to most mounting surfaces and no additional fastener will be required to hold the base in place against the mounting surface. The holding power of the tape increases gradually after installation; and after a period of approximately 18 hours, the base will be firmly bonded to the mounting surface. Once the tape has bonded to a surface, fluctuations in ambient temperature either above or below 50° F. will have no effect on the holding power of the tape itself.

In the event the ambient temperature at the time of installation is below 50° F., the tape will still provide a means of temporarily holding the base in place and a number of the bases can be installed in their proper positions. In order to then firmly affix the base to the mounting surface, a Hilti BD1 hand tool can be employed to drive one Hilti-Micky-Pin in the center of each base into the supporting surface W of masonry or concrete, for example. On surfaces other than masonry or concrete, any common type of appropriate fastener can be used to secure the base of the brackets 14 to the mounting surface.

For exemplary purposes, some examples of typical installations are shown in FIG. 1. With reference to FIG. 1, a typical straight line run 74 is shown which involves a 10′ cover section 56a encasing four 6″ mounting brackets 14a, 14b, 14c and 14d and the lines of tubing carried thereby and extending therebetween. The brackets 14a and 14d are installed onto the supporting surface W by the adhesive film or by using a penetrating fastener at 10′ centers while the brackets 14b and 14c are installed by the same means at approximately 34″ apart. Any reference point may be followed in determining the exact location of such run.

After the brackets are thusly installed onto the supporting surface W, the plastic tubing lines are laterally snap pressed into the channels. The cover 56a is then snapped into place.

In order to make a T connection 76, a workman would cut a section out of one side wall of the cover and butt the T section 78 into the straight run 80 with the end of the T section 78 enclosing the cut out portion which is slightly smaller than the width of the cover.

In order to make an elbow junction or corner turns, the brackets 14e and 14f, for example in FIG. 1, would be placed in close proximity. At corners, the cover sections will be mitered.

Since the cover itself is a long length of plastic, it will be subject to expansion and contraction due to ambient temperature changes. This rate of expansion and/or contraction is approximately 5/16" (per 10' section) for a 100° F. change in ambient temperature. While in the normal installations, one would never expect to experience this great an ambient temperature change, there will be at least some changes in ambient temperature, especially in a boiler room. Therefore, if one installs the cover when the temperature is approximately 50° F., and it is figured that at some times the ambient temperature would approach 100° F., one should plan on leaving approximately 3/16" every ten feet. On the other hand, if the temperature is high during the initial installation, one should butt the joints without leaving a space between the joints.

The recommended spacing for the base pieces described previously is for straight runs. One will find that when T's or elbows are field fabricated, additional and closer spaced brackets will be used. This will be necessary in order to make neater joints or connections.

When making elbows, the brackets will not be butted. Approximately 3 to 4 inches should be left between the bracket and a corner. This will allow the workman to hold the plastic tubing firmly in place at the point of turn as well as hold the cover properly in place and yet still have sufficient space to make the proper radius bends on the plastic tubing. This is illustrated by the pair of brackets 14e and 14f and the pair of brackets 14g and 14h in FIG. 1.

It can thus be realized and appreciated from the foregoing description taken in conjunction with the accompanying drawings, that an ideal and extremely novel and highly practical plastic duct installation for pneumatic transmission or the like purposes is provided and further details of use are believed unnecessary for those skilled in the art. However, it remains self-evident and quite obvious that the designated usage and environment are merely exemplary and that the plastic duct system can be utilized in whole or in part for other construction purposes. Accordingly, since changes in detail and arrangement are envisioned, it is intended that all matter contained in the foregoing description or shown on the accompanying drawings shall be interpreted as illustrative and not in a limiting sense.

What is claimed is:

1. A plastic duct installation for pneumatic transmission in automatic temperature control systems comprising
   a plurality of individual lines of plastic tubing,
   plastic mounting brackets including bases and separate longitudinal channels provided on one face of each of the bases,
   means for fixedly attaching said bases in selected spaced arrangements on a supporting surface with the channels outstanding from such surface,
   said channels having means frictionally gripping the tubing laterally pressed therein and restraining the tubing against lateral withdrawal while permitting the tubing to be moved longitudinally therein,
   a U-shaped plastic cover overlying the entire extent of the tubing including the portions held by the brackets and the portions thereof spanning the distance between brackets, and
   interengaging locking means carried by the brackets and the cover so that the cover snap-fits over and onto the brackets.

2. The invention of claim 1 wherein said channels on each bracket are defined by the said face of the base and laterally spaced apart, longitudinally extending side walls outstanding from said face and integral with the base.

3. The invention of claim 2 wherein said tubing gripping means includes longitudinal beading formed on the confronting faces of the channel side walls.

4. The invention of claim 3 wherein said beading is hemispherical and engages the tubing.

5. The invention of claim 1 wherein the base of each bracket has an opposite face provided with laterally spaced longitudinally extending ribs.

6. The invention of claim 5 wherein said ribs define grooves on said face of the base and said attaching means for the brackets includes an adhesive positioned in the grooves and a protective peel-off strip overlying the adhesive.

7. The invention of claim 5 wherein said ribs have free longitudinal edges provided with angular locking lips and said channel walls have outer free longitudinal edges provided with locking lips with said locking lips on the ribs being interengageable with the locking lips on the channel walls so as to interlock the brackets in piggyback layer arrangements.

8. The invention of claim 7 wherein said cover is of a depth to overlie such piggyback arrangement and lockingly interengage with the innermost bracket.

9. The invention of claim 1, wherein said interengaging locking means between the brackets and the cover includes said cover having side walls terminating in free longitudinal edges having locking lips and said base of each bracket has cooperating locking lips on the side edges thereof.

10. The invention of claim 9 wherein the base of each bracket has an opposite face provided the longitudinal extending ribs adapted to engage the supporting surface and space the base therefrom, said locking lips on the side edges of the base of each bracket extending laterally from the base and the locking lips on the side walls of the cover engaging under the base locking lips.

11. Means for installing a plurality of individual elongated flexible elements in an orderly collective assembly on a supporting surface of relative wide expanse comprising
    a plurality of plastic brackets of relatively short lengths, each of said brackets having a base provided with an inner and an outer face,
    channel forming walls projecting from the outer force of the base and disposed in laterally spaced longitudinal relation so as to define a plurality of parallel channels with the base, means for fixedly superimposing said base of each bracket on a supporting surface with the inner face of the base of each bracket engaging the supporting surface,
    said brackets being mounted on the supporting surface in selectively spaced apart relation with the channels being adapted to receive frictionally and retain the flexible elements with such flexible elements passing therethrough and being strung in a taut condition between adjoining spaced brackets,
    an elongated U-shaped plastic cover encompassing the entire extent of the mounted elements and each bracket base having opposing side edges, and
    interengaging snap locking means carried by the side edges of each bracket base and by the free edges of the side walls of the cover.

12. The invention of claim 11 wherein said channel walls are provided with longitudinally extending beadings for frictionally gripping the flexible elements.

13. The invention of claim 11 whesein said inner face of the base of each bracket is formed with laterally spaced longitudinally extending ribs projecting a very slight distance outwardly from the base face.

14. The invention of claim 13 wherein said ribs and the outer edges of the channel walls are provided with an interengaging locking means whereby the base of a bracket can be snap locked onto the outer edges of the channel walls of another bracket to position the brackets in a piggyback arrangement, said cover being of a depth to overlie the piggyback brackets and lockingly engage with the innermost bracket.

References Cited

UNITED STATES PATENTS

| | | | |
|---|---|---|---|
| 686,052 | 11/1901 | Golding | 138—106 X |
| 836,121 | 11/1906 | Kirkpatrick | 138—117 |
| 2,027,619 | 1/1936 | Rutherford | 138—106 |
| 2,049,184 | 7/1936 | Walsleben | 138—106 |
| 2,867,681 | 1/1959 | Huehnel | 138—106 X |

LOUIS K. RIMRODT, Primary Examiner